United States Patent
Merlo et al.

(10) Patent No.: US 11,168,752 B2
(45) Date of Patent: *Nov. 9, 2021

(54) METHOD FOR MANUFACTURING A SENSORIZED BRAKING ELEMENT, IN PARTICULAR A BRAKE PAD AND A SENSORIZED BRAKE PAD OBTAINED THEREBY

(71) Applicant: ITT Italia S.r.l., Lainate (IT)

(72) Inventors: Fabrizio Merlo, Barge (IT); Luca Martinotto, Barge (IT); Mattia Solari, Barge (IT); Daniele Donzelli, Barge (IT)

(73) Assignee: ITT Italia S.r.l.

(*) Notice: Subject to any disclaimer, the term of this patent is extended or adjusted under 35 U.S.C. 154(b) by 0 days.

This patent is subject to a terminal disclaimer.

(21) Appl. No.: 16/173,355

(22) Filed: Oct. 29, 2018

(65) Prior Publication Data

US 2019/0072143 A1 Mar. 7, 2019

Related U.S. Application Data

(63) Continuation of application No. 15/323,186, filed as application No. PCT/IB2015/056861 on Sep. 8, 2015, now Pat. No. 10,113,598.

(30) Foreign Application Priority Data

Sep. 8, 2014 (IT) .......................... TO2014A000700

(51) Int. Cl.
*F16D 65/092* (2006.01)
*F16D 66/02* (2006.01)
(Continued)

(52) U.S. Cl.
CPC .......... *F16D 65/092* (2013.01); *F16D 65/08* (2013.01); *F16D 65/097* (2013.01); *F16D 66/00* (2013.01);
(Continued)

(58) Field of Classification Search
CPC ........ F16D 65/092; F16D 65/08; F16D 66/00; F16D 66/02; F16D 66/021;
(Continued)

(56) References Cited

U.S. PATENT DOCUMENTS 4,495,434 A * 1/1985 Diepers .................... G01L 1/146
310/338
5,302,940 A * 4/1994 Chen ...................... B60Q 1/441
188/1.11 L
(Continued)

FOREIGN PATENT DOCUMENTS

DE          4242084 A1 * 6/1994 ........... F16D 66/027
DE   10 2005 013 142 A1   9/2006
(Continued)

OTHER PUBLICATIONS

EPO translation, DE 10 2006 053 489 A1, May 2008. (Year: 2008).*
(Continued)

*Primary Examiner* — Thomas J Williams
(74) *Attorney, Agent, or Firm* — Barclay Damon LLP

(57) ABSTRACT

A method in which at least one piezoceramic sensor and an electric circuit to collect an electric signal emitted by the piezoceramic sensor when subjected to a mechanical stress and possibly processing it are made as an electrically insulated unit. The unit is equipped with at least a branching ending with respective electric contacts and having the connected at least one piezoelectric sensor. The electric circuit and the at least one sensor are mechanically fixed integral with a first surface of a supporting metal element of
(Continued)

a brake pad. Branching is formed so as to position the at least one piezoelectric sensor at a predetermined point of the first surface.

19 Claims, 3 Drawing Sheets

(51) Int. Cl.
*F16D 69/00* (2006.01)
*F16D 65/097* (2006.01)
*F16D 65/08* (2006.01)
*F16D 66/00* (2006.01)
*F16D 121/28* (2012.01)
*F16D 129/12* (2012.01)

(52) U.S. Cl.
CPC ............ *F16D 66/02* (2013.01); *F16D 69/00* (2013.01); *F16D 2066/001* (2013.01); *F16D 2066/005* (2013.01); *F16D 2069/006* (2013.01); *F16D 2121/28* (2013.01); *F16D 2129/12* (2013.01); *F16D 2250/0084* (2013.01); *F16D 2300/18* (2013.01)

(58) Field of Classification Search
CPC ......... F16D 2066/001; F16D 2066/005; F16D 2066/006; F16D 2069/005; F16D 2069/006; F16D 2250/0084; F16D 2300/18

See application file for complete search history.

(56) References Cited

U.S. PATENT DOCUMENTS

| | | | | |
|---|---|---|---|---|
| 5,969,270 | A * | 10/1999 | Doemes | F16D 65/18 73/780 |
| 7,127,948 | B2 * | 10/2006 | Tavares | G01L 9/008 73/514.34 |
| 8,631,709 | B2 * | 1/2014 | Kurtz | G01L 1/18 73/727 |
| 9,415,757 | B2 * | 8/2016 | Martinotto | F16D 65/08 |
| 9,541,461 | B2 * | 1/2017 | Cogliati | G01L 9/0044 |
| 9,964,167 | B2 * | 5/2018 | Martinotto | F16D 65/0006 |
| 10,113,598 | B2 * | 10/2018 | Merlo | F16D 65/097 |
| 2001/0032898 | A1 * | 10/2001 | Bankes | D21D 1/002 241/30 |
| 2004/0187591 | A1 * | 9/2004 | Baumann | G01L 5/225 73/779 |
| 2006/0254868 | A1 * | 11/2006 | Thiesing | B60T 17/221 188/159 |
| 2014/0311833 | A1 * | 10/2014 | Martinotto | G01L 1/16 188/1.11 E |
| 2019/0005743 | A1 * | 1/2019 | Serra | G01L 5/0028 |

FOREIGN PATENT DOCUMENTS

| | | | | |
|---|---|---|---|---|
| DE | 10 2006 053 489 A1 | 5/2008 | | |
| DE | 102006053489 A1 * | 5/2008 | ............ | G01L 5/225 |
| DE | 10 2012 004 117 A1 | 9/2013 | | |
| DE | 102012004117 A1 * | 9/2013 | ........... | A43B 3/0005 |
| EP | 0744558 A1 | 11/1996 | | |
| EP | 1 431 606 A1 | 6/2004 | | |
| GB | 2476423 A | 9/2011 | | |
| KR | 20090057640 A | 6/2009 | | |
| KR | 10-2006-00000085 A | 10/2014 | | |
| WO | WO-9923393 A1 * | 5/1999 | ............ | F16D 65/18 |
| WO | WO 2014/170726 A1 | 10/2014 | | |

OTHER PUBLICATIONS

EPO translation, DE 10 2012 004 117 A1, Sep. 2013. (Year: 2013).*
European Patent Office (ISA/EP), International Search Report and Written Opinion from PCT Application No. PCT/IB2015/056861, completed Jan. 7, 2016.
Wagner et al., SAE International, Technical Paper Series, Paper #2004-01-2773, entitled "Active Control of Brake Squeal Via Smart Pads", 22$^{nd}$ Annual Brake Colloquium & Exhibition, Anaheim, California, Oct. 10-13, 2004.
Chinese Office Action for CN 201580036478.2; dated May 22, 2018; 11 pages.

* cited by examiner

METHOD FOR MANUFACTURING A SENSORIZED BRAKING ELEMENT, IN PARTICULAR A BRAKE PAD AND A SENSORIZED BRAKE PAD OBTAINED THEREBY

CROSS REFERENCE TO RELATED APPLICATIONS

This application is a continuation application of U.S. patent application Ser. No. 15/323,186, filed Dec. 30, 2016, which is a national stage application of PCT/IB2015/056861, filed Sep. 8, 2015, which claims priority of Italian Patent Application No. TO2014A000700, filed Sep. 8, 2014, the entire contents of each application herein being incorporated by reference.

TECHNICAL FIELD

The present invention relates to a method for manufacturing braking elements, in particular brake pads with integrated sensors that allow to detect the forces acting upon the braking element during vehicle braking. The invention also relates to a sensorized brake pad obtained by means of this method.

BACKGROUND ART

In the vehicle braking systems currently in production, there is no way to detect while using the vehicle, if not by means of external systems, the forces that are exchanged between the brake pads (or brake shoes for vehicles still equipped with drum brakes) and the element to be braked, disc or drum, that is attached to the wheel. This makes it impossible to detect and/or predict the occurrence of many drawbacks which can vary from abnormal brake pad wear due for example to the pads "touching" the disc even when braking is not taking place due for example to a wrong caliper adjustment, rather than the noise, vibration and undesirable squealing while braking. These problems can lead to malfunctions or even to premature and often unnecessary brake pad replacement.

KR2004-48957A attempts to solve the problem of the generation of noise and vibration during braking by arranging piezoelectric elements behind the metal support for the brake pad which is known as the "backplate". These piezoelectric elements, as a result of the vibrations to which the backplate is subjected during use, generate electric energy which is subsequently dissipated by supplying said energy to LEDs. By absorbing energy in this manner these vibrations are dampened.

More generally the use of piezoelectric elements (sensors or actuators) for experimental purposes is known in the art. For example taking piezoelectric elements and arranging them on the backplate towards the outer edges of the brake caliper in order to detect the deformations of said backplate during braking bench tests or for counteracting the vibrations that are generated during braking by electrically supplying piezoelectric actuators such that these actuators then apply forces to the backplate that should counterbalance and thus dampen the vibrations.

For example, the SAE Technical Paper 2004-01-2773 describes a study conducted by the University of Darmstadt in which piezoelectric elements are coupled together with acceleration sensors and used both as sensors and actuators for the suppression of squealing during braking. The same study points out however that the system described should be considered as a design aid tool and not as a system suitable for use in the mass production of brake pads.

It should be noted in fact that at the moment it is considered to be extremely difficult, if not impossible, to have piezoelectric sensors in the vicinity of brake pads or on the brake pads themselves, both due to the high temperatures and pressures to which brake pads are subjected during the production process, or that are developed during braking, and to the evident construction difficulties associated with a system that should effectively function in an efficient and reliable way.

DISCLOSURE OF INVENTION

The object of the present invention is to provide a construction method for realizing in a simple and economical way brake pads and, more generally, braking elements, and therefore also brake shoes, wherein it is possible during use to detect, in an efficient and reliable way during braking, the presence and/or extent of the forces at the interface between the braking element (pad or shoe) and the element being braked (disc or drum brake).

A further object of the invention is that of providing a braking element, in particular a sensorized brake pad, that during use is capable of transmitting an electric signal which is proportional to the forces applied to said braking element as a result of the contact with the element being braked.

The invention therefore relates to a method for the construction of braking elements, in particular brake pads, with sensors, as defined in the following claims. The invention further relates to a braking element, in particular a brake pad, with sensors, according to the claims.

According to the invention, at least one piezoceramic sensor designed for emitting, without the need for electric power, an electric signal only when subjected to a mechanical stress and selected so as to be operative even at temperatures at or above 200° C. (therefore selected from the group consisting of piezoceramic sensors with maximum operating temperatures equal to or higher than 200° C. in so far as they are made from a piezoceramic material with a Curie temperature that is higher than 200° C.) is fixed onto a first surface of a supporting metal element (so-called backplate) of the braking element intended in use to face towards an element to be braked, such as a disk or drum, of a vehicle together with an electric circuit to capture the electric signal of the at least one sensor and possibly process it; the electric circuit is made as an electrically insulated unit equipped with at least one branching which ends with respective electric contacts for the at least one piezoelectric sensor, which is connected electrically and mechanically to the electric contacts arranged at the end of the at least one branching; furthermore, the electric circuit and the at least one sensor are mechanically fixed integral to the first surface, with the branching made so as to position the at least one piezoelectric sensor at a predetermined point of the first surface.

There is then formed upon the electrically insulated unit and upon the at least one sensor, possibly further covered by an electrically insulated layer, a thermally insulating and damping layer (known as an underlayer) which extends over the entire first surface and above the latter a block of friction material is formed which is integrally supported by the supporting metal element; consequently, the at least one sensor remains embedded directly within the block of friction material, with the interposition of the damping and thermally insulating layer.

Preferably, the first surface is provided with at least one seat for the at least one piezoelectric sensor defined by a first recess having a depth of substantially an order of magnitude less than a thickness of the at least one piezoelectric sensor measured perpendicularly to the first surface (typically the first recess has a depth of about 0.1 mm as compared to the thickness of a piezoceramic sensor of 1 mm) and at least one second groove-shaped recess for housing the electric circuit and at least one branching thereof substantially flush with the first surface; for this purpose the second recess has a depth of about 1 mm and has a shape adapted to receive the at least one branching, so as to preserve the integrity of the wires and/or electric tracks forming part of the electric circuit both during the friction material block manufacturing steps and during the later stages of use of the friction element on the vehicle.

The first and second recesses are made by machining tool, laser or fine blanking of the supporting metal element.

The at least one piezoelectric sensor is integrally fixed to the first surface in an electrically insulated manner, for example by gluing; it can also be glued directly to an electric contact of the electric circuit by means of an electrically conductive adhesive and the electrically insulated unit formed by the electric circuit is in turn glued directly onto the first surface of the supporting metal element. The other contact of the at least one branch can be connected electrically and mechanically to the at least one sensor in the same way or by means of wire bonding.

Preferably, the electric circuit is defined by a plurality of electrically conductive tracks electrically insulated between them and with respect to the supporting metal element, each track ending towards the at least one piezoelectric sensor with at least one electric contact electrically and mechanically connected to the sensor, at least one pair of tracks defining a branching.

In the case of mass-production, the electric circuit with the tracks, the contacts and the respective electrically insulating layers suitably arranged above and below the tracks are formed directly by screen printing on the first surface of the supporting metal element, preferably within the at least one second recess, if present; a first contact of a first track is directly connected electrically and mechanically to a first face of the sensor, while a second contact of a second track, and obtained in a position immediately adjacent to and coplanar with the first contact, is connected by wire-bonding to a second face of the sensor opposite to the first, or to a different portion of the first face of the piezoceramic sensor; in the latter case, the piezoceramic sensor must be of the type with built up electrodes, provided with a pair of electrodes for connection to the electric circuit both obtained, side by side, upon the first face, which for example is fixed to both contacts of the branching of the electric circuit by means of an electrically conductive glue or by means of soldering.

For small and medium production series, e.g. for the production of samples, the electric circuit and related tracks and the contacts are instead obtained by any suitable process, such as screen printing, on a first electrically insulating polymeric layer, preferably made of a polyimide e.g. of the Kapton® type and later at least the tracks are covered with a second electrically insulating polymeric layer preferably made of a polyimide e.g. of the Kapton® type, in order to form a self-supporting unit; the self-supporting unit is then glued directly above the first surface of the supporting metal element and finally the at least one piezoelectric sensor is mechanically and electrically connected to a first contact of a first track and to a second contact of a second track obtained in a position immediately adjacent to and coplanar with the first contact, arranging a first face of the sensor against the first contact and folding the second contact book-wise onto the first contact and against a second face of the sensor opposite the first, with the sensor arranged sandwiched between the first and the second contact; or connecting the second contact with the second face of the sensor by means of wire bonding, without the need therefore to bend the second contact towards the first; the at least one sensor being finally coated with an electrically insulating layer, located on the sensor, for example constituted by a drop of sealant.

The electric circuit may terminate at the opposite side of the at least one sensor with a flat multichannel electrical connection cable or, preferably, on one edge of the supporting metal element, arranged on the opposite side to the at least one branching of the electrical circuit, a shallow recess is obtained for receiving an electric connector which is electrically connected to the electric circuit in order to capture the signals thereof.

BRIEF DESCRIPTION OF THE DRAWINGS

Additional characteristics and advantages of the present invention will be apparent from the following description of some non-limiting embodiments thereof reported here exclusively for exemplification purposes with respect to the enclosed drawings, wherein.

BEST MODE FOR CARRYING OUT THE INVENTION

Figure 1:
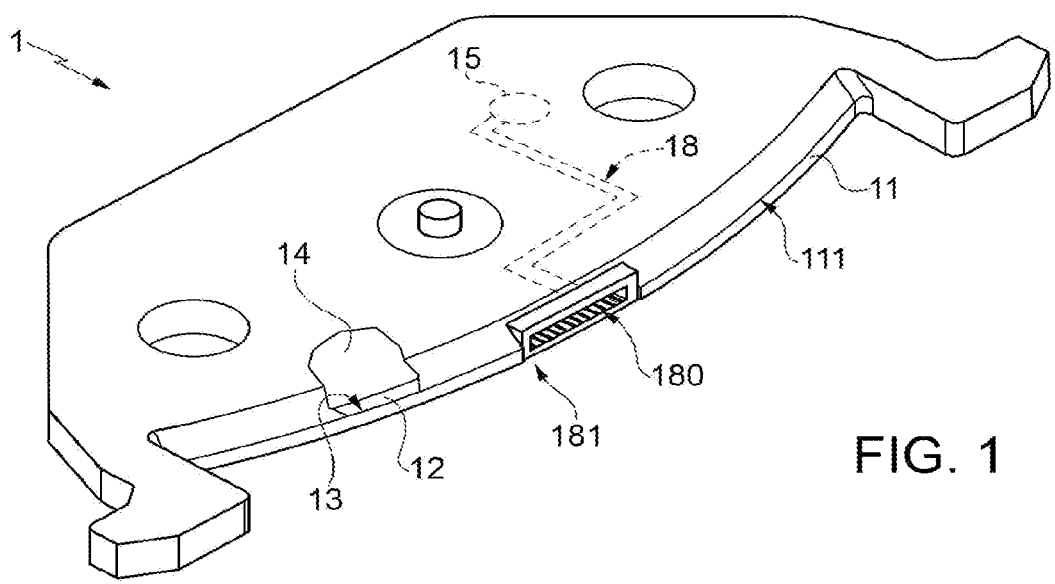
FIG. 1 schematically illustrates a perspective view of a braking element, in this case a brake pad, constructed according to the invention.

With reference to FIG. 1 a sensorized braking element 1 for vehicles is referenced as a whole with 1, in the example illustrated a brake pad, intended to equip a vehicle braking system, known in the art and not shown for simplicity.

Herein and below, specific reference will be made to a braking element consisting of the brake pad 1, but it is clear that what will be stated herein also applies identically to a brake shoe of a drum brake.

The brake pad 1 consists of a supporting metal element 11, otherwise known as a "backplate", in the form of a flat plate shaped with a contour, a damping and thermally insulating layer 12, known as an "underlayer" which is arranged over a first surface 13 of the supporting metal element 11 which in use is intended to be directed toward an element to be braked, for example a vehicle brake disc, and a block or layer 14 of friction material which is integrally supported by the supporting metal element 11 on the side of the first surface 13 and above the damping and thermally insulating layer 12.

It is clear that in the case of a brake shoe there could be elements corresponding to those described for the brake pad 1 for which, for a person skilled in the art, the following description is easily transferable such that sensorized brake shoes can also be constructed.

According to one aspect of the invention, the brake pad 1 is sensorized in such a manner as to be capable of detecting the forces that are exchanged in use upon contact between the pad 1 and the element to be braked.

For this purpose the brake pad 1 according to the invention comprises at least one piezoceramic pressure sensor 15 (FIGS. 1 and 9) adapted to emit an electric signal when subjected to a mechanical stress and selected so as to also operate at temperatures equal to or higher than 200° C. (thus selected from the group consisting of piezoceramic sensors with a maximum operating temperature equal to or higher than 200° C. in so far as they are made from a piezoceramic material with a Curie temperature that is higher than 200° C.) and used according to an aspect of the invention without a seismic mass, which instead equips the well-known piezoelectric accelerometers.

The sensor 15 is defined by a single block 5 of suitable piezoceramic material which is preferably cylindrical in shape and delimited by a pair of opposing planar faces 6 and 7 arranged in use to be parallel to the surface 13; normally, the sensors 15 used according to the invention are provided with opposing electrodes 16 each positioned on one of the two faces 6 and 7; the electrodes 16 serve both to pick up the electric signal generated by the sensors 15 in use and to maintain their polarization: indeed, the piezoceramic material with which the sensors are made is not naturally piezoelectric but it becomes so when the sensors are subjected to a known polarization treatment by applying an appropriate voltage to the opposing electrodes 16.

The sensor 15 used according to the invention may however also be of the built up electrodes type, wherein the electrode 16 of the face 6 used for the polarization, once polarization has occurred, is removed to be replaced by an electrode 16B, only for picking up the electric signal, and applied to the same face 7 of the block 5 of piezoceramic material provided for the other electrode 16.

The brake pad 1 also comprises an electric circuit 18 for capturing the electric signal generated, without the need of a power supply, by the at least one piezoceramic sensor 15 when it is subjected to a mechanical stress in the direction of polarization, in this case perpendicular to faces 6,7, and possibly processing it.

With reference to FIGS. 2 to 6, the electric circuit 18 is made, according to the main aspect of the invention, as an electrically insulated unit 118 equipped with at least one branching 119 ending with the respective electric contacts 20,21 for the at least one piezoelectric sensor 15, which is electrically and mechanically connected to the electric contacts 20,21 (FIG. 7) arranged at the end of the at least one branching 119; in turn, the electric circuit 18 and the at least one sensor 15 are mechanically integrally fixed to the surface 13 of the supporting metal element 11; the at least one branching 119 is finally made in such a manner as to position, when the electric circuit 18 is coupled to the supporting metal element 11, the at least one piezoelectric sensor 15 at a predetermined point on the surface 13 and in such a manner that the at least one piezoelectric sensor 15 is directly and completely embedded within the friction material block 14 with the interposition of the damping and thermally insulating layer 12.

In the preferred illustrated embodiments, the braking element 1 comprises a plurality of piezoceramic sensors 15 arranged in a discrete manner on surface 13 of the supporting metal element 11 according to a predetermined pattern and also a temperature sensor 150 of a known type (FIG. 5), but also integrally arranged on the first surface 13 of the supporting metal element 11 and all of these being electrically and mechanically connected to the electric circuit 18, which is made to capture, and possibly separately process, an electric signal emitted by each sensor 15,150.

The electric circuit 18 ends, on the side opposite to the sensors 15,150, in an electric connector 180 (FIG. 1) integrated with an edge 111 of the supporting metal element 11, housed within a shallow recess 181 (FIGS. 3 and 8) obtained upon the edge 111.

The sensors 15 are spaced apart, preferably according to a symmetrical matrix and can be activated individually, in such a manner as to occupy the surface 13, but only discreetly, that is to say at the prefixed points/portions limited by the same.

The sensors 15 are selected from amongst commercial type sensors, insofar as they are chosen from amongst those piezoceramics that have the previously described characteristics and, according to an aspect of the invention, they must present a thickness, measured perpendicularly to the surface 13, which is equal to or less than that of the damping and thermally insulating layer 12, therefore, in general, non more than 1 mm.

Figure 9:
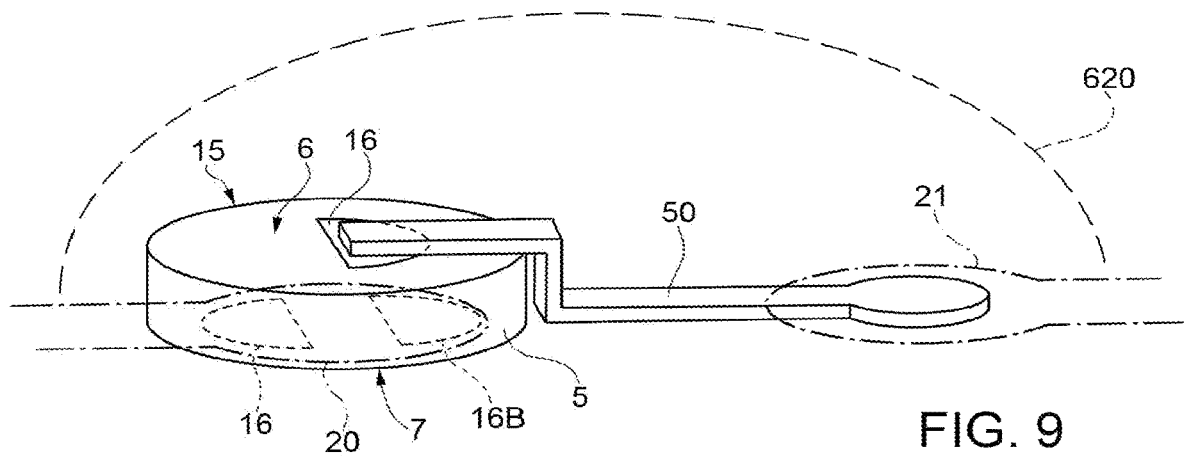
FIG. 9 schematically illustrates and on a greatly enlarged scale, a detail of the electric connection between the components of FIG. 6.

In addition to a plurality of sensors 15 such as that schematically illustrated in FIG. 9 and in addition to the temperature sensor 150, the brake pad 1 is preferably also provided with a shear stress piezoceramic sensor 15b (FIG. 6) which is always electrically and mechanically connected to a pair of contacts 20,21 of the electric circuit 18, but is polarized in a direction parallel to the surface 13 and to the faces 6,7, rather than perpendicular to the same. In addition, this sensor 15b, which is not shown in detail, presents the form of a parallelepiped block, rather than cylindrical as per the other sensors 15.

For the temperature sensor connection 150 the circuit 18 is provided with a pair of contacts 200,201 which are similar to the contacts 20,21.

The braking element 1 is manufactured according to a method that includes the steps of rigidly fixing directly onto the surface 13 of the supporting metal element 11 of the braking element which surface is intended in use to face towards an element to be braked (known and not illustrated for simplicity), for example, a vehicle disc or drum, at least one piezoceramic sensor 15 adapted to emit an electric signal when subjected to a mechanical stress; and an electric circuit 18 to capture the electric signal and possibly processing it.

According to the invention the electric circuit 18 is however made as an electrically insulated unit 118 equipped with at least one branching 119 (in the illustrated embodiments, a plurality of branches 119, one for each sensor 15,150) ending with respective electric contacts 20,21 (or 200,201 in the case of the temperature sensor 150) for the electric connection of the sensors 15,150; the at least one piezoelectric sensor/the plurality of sensors 15 is/are electrically and mechanically connected to the electric contacts 20,21 (200,201) arranged at the end of each branching 119 and the electric circuit and the at least one sensor 15 are mechanically integrally fixed to the surface 13, the branching/s 119 being formed such as to position the at least one piezoelectric sensor 15, or the plurality of sensors 15, 15b, 150, each at a predetermined point upon the surface 13.

To allow for the housing of the insulated unit 118 that defines the electric circuit 18 and the sensors 15,150, the surface 13, according to a preferred aspect of the invention, is provided with at least one seat 30 for the at least one piezoelectric sensor 15 defined by a first recess 31 having a depth of substantially an order of magnitude less than the thickness of the at least one sensor 15 measured perpendicularly to the surface 13 and at least a second groove-shaped recess 32 (FIG. 2) for housing the electric circuit 18 and at least one branching 119 thereof substantially flush with the surface 13.

In the illustrated example, the surface 13 is provided with a plurality of seats or "emplacements" 30 defined by recesses 31 which are each adapted to receive a sensor 15, 15b or 150, and that are about 0.1 mm deep (the sensors 15,150 being 1 mm thick) and with a recess 32 that is branched in such a manner as to be able to house all of the branchings 119, present in the number of one for each sensor 15,15b,150 at most flush with the surface 13 and, therefore, avoiding the situation wherein the electric circuit 18, during the step of forming the friction material block 14, is subsequently incorporated or affected by the block 14; in this case the recess 32 (which may be continuous or discontinuous) is about 1 mm deep. The recesses 31 and 32 are manufactured by machining tool, laser or fine blanking of the supporting metal element 11 during the step of obtaining the latter from the raw material.

Above the electric circuit 18 and at the at least one piezoelectric sensor 15 which is electrically connected to the electric circuit 18 there is then formed upon the surface 13 of the supporting metal element 11 a layer or friction material block 14 (after forming also the layer 12) which incorporates, as a consequence of that which has been described, at least part of the at least one piezoelectric sensor 15 within the thickness of the same friction layer 14, with the interposition of the layer 12.

Figure 2:
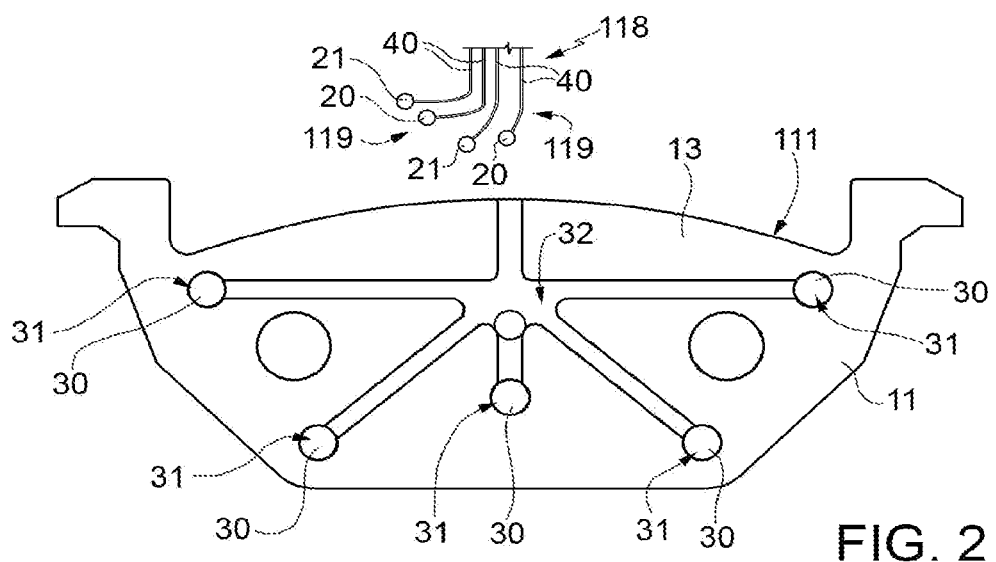
FIG. 2 schematically illustrates a plan view from above of a supporting metal element of the brake pad in FIG. 1.
Figure 3:
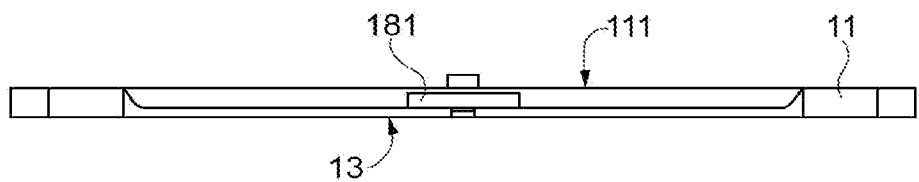
FIG. 3 schematically illustrates a front view in elevation of supporting metal element in FIG. 2.

In FIG. 2 a first embodiment of the electric circuit 18 and the electrically insulated unit 118 is schematically illustrated; in this case the circuit 18 is formed by a plurality of respective conductor cables 40 which are electrically insulated from each other and from the supporting metal element 11 (for example insofar as they are equipped with an appropriate insulating sheath) and electrically connected to the contacts 20,21, where each one of the cables 40 terminates; the cables 40 are arranged within the respective grooves of the supporting metal element 11 defined by the recess 32. The sensors 15, 15b and 150 are electrically connected to each branching 119, consisting of the coupling of two cables 40, by means of wire bonding to at least one of the contacts 20,21 (or 200,201 for the sensor 150) and directly, by means of gluing with electrically conductive adhesives, or by means of soldering, to the other contact 20,21 (or 200,201), while at least one piezoelectric sensor 15, in the example illustrated a plurality of sensors 15, 15b and the sensor 150 is/are integrally fixed to the surface 13, within the seats 30 of the recess/es 31 in such a manner as to be electrically insulated by merely gluing.

An example of a wire bonding connection is illustrated in a non-limiting way in FIG. 9: in this example a sensor 15 is electrically connected directly to the contact 20 with its electrode 16 of the face 7, which is leaning against the contact 20, while the other electrode 16 of the face 6 is connected to the contact 21 via a metallic bridge 50, soldered (or glued with electrically conductive adhesives) to both.

In FIGS. 4, 5, 6, 7 and 8 other embodiments of the electric circuit 18 are illustrated, which in these embodiments is defined by a plurality of electrically conductive tracks 51, electrically insulated from each other and with respect to the supporting metal element 11, each track 51 ending towards the at least one piezoelectric sensor 15/the plurality of sensors 15, 15b, 150 with at least one electric contact 20 or 21 (or 200,201) electrically and mechanically connected to the sensor 15,15b,150: at least one pair of tracks 51 defines each branching 119, which carries a single sensor 15,150.

Figure 7:
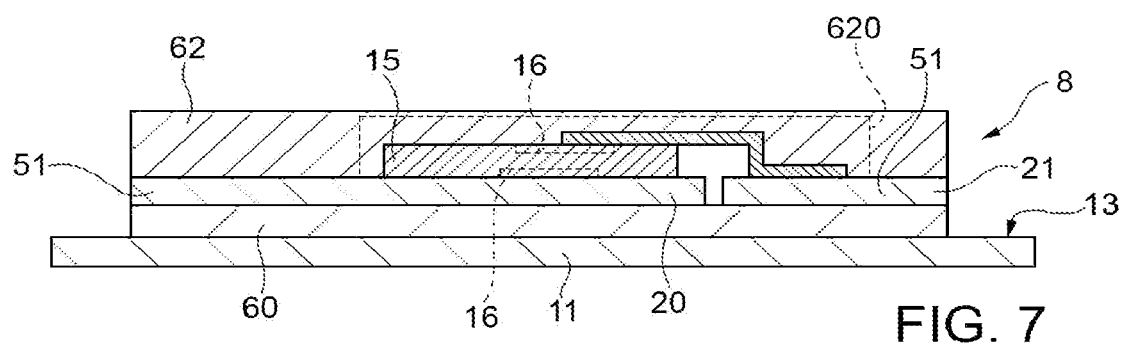
FIG. 7 illustrates in an overall schematic manner and not to scale a sectional view according to the dashed line VII-VII of FIG. 6.
Figure 8:
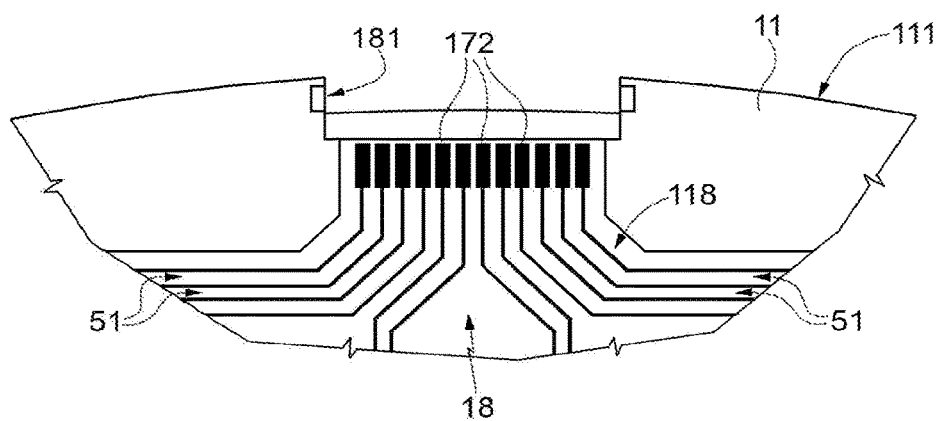
FIG. 8 schematically illustrates an enlarged plan view of a detail of a variant of the components shown in FIGS. 5 and 6.

In particular, according to the embodiment of FIG. 8, to which the sectional view of FIG. 7 can schematically also be referred, although relating to a section of FIG. 6, the electric circuit 18 with the tracks 15, the contacts 20,21 and 200,201 and their respective electrically insulating layers 60 and 62 appropriately arranged above and below the tracks 51 are directly obtained by means of screen printing over the surface 13 of the supporting metal element 11, within the recesses 31 and 32 when present; in this embodiment the recesses 31 and 32 are not strictly necessary insofar as the set of tracks 51 together with the insulating layers does not exceed the thickness of 20 microns. A first contact 20 (or 200) of a first track 51 is electrically and mechanically connected to a first face 7 of the sensor 15 (as shown, but this also applies to the sensors 15b and 150), while a second contact 21 (or 201) of a second track 51 is obtained in a position immediately adjacent and coplanar with the first contact 20 and is connected to a second face 6 of the sensor 15, opposite to the first, by means of wire-bonding using a bridge 50. Alternatively, according to an obvious variant based upon that which has been described above and therefore not shown, the second contact 21/201 can be connected to a different portion of the first face 7 of the piezoceramic sensor 15, directly to an electrode 16b; in this case the sensor concerned 15 (or 15b or 150) must be of the builtup electrodes type, namely wherein the contact electrodes 16 and 16b are both carried by the same face 7.

In this embodiment, the insulating layers 60,62 are made from a base of alumina/graphite (or silicate matrix) particles that have been immersed in a polymeric type matrix (preferably polyamide); the conductive part defined by the tracks 51 is made up of silver or palladium based screen printing pastes; the integration of the piezoelectric sensor 15 to the emplacements of the circuit 18, defined by the contacts 20,21 or 200,201, is obtained by wire-bonding by means of soldering, for example with tin pastes, or by silver-loaded epoxy resins gluing.

First of all, the layout of the circuit 18 with the emplacements for receiving the contacts 20,21/200,201 is formed upon the surface 13, extending by means of silk screening the polymeric base containing the insulating particles or an inorganic insulating paste, thus forming the continuous or discontinuous layer 60; above this layer 60 there are formed, again by means of screen printing, the tracks 51 and the contacts 20, 21, 200, 201 by appropriately spreading the silver or palladium based pastes; next, an insulating layer 62 is deposited, again by means of screen printing, in order to electrically insulate the circuit 18, leaving uncovered only the contacts 20,21,200,201; finally the sensors 15,15b,150 are positioned, fixed and electrically connected to the contacts 20, 21, 200, 201, depositing then upon the sensors 15,15b,150, the relative contacts 20, 21, 200, 201 and the relative electric connections a drop of electrically insulating sealant, made for example of an epoxy or inorganic base.

Figure 4:
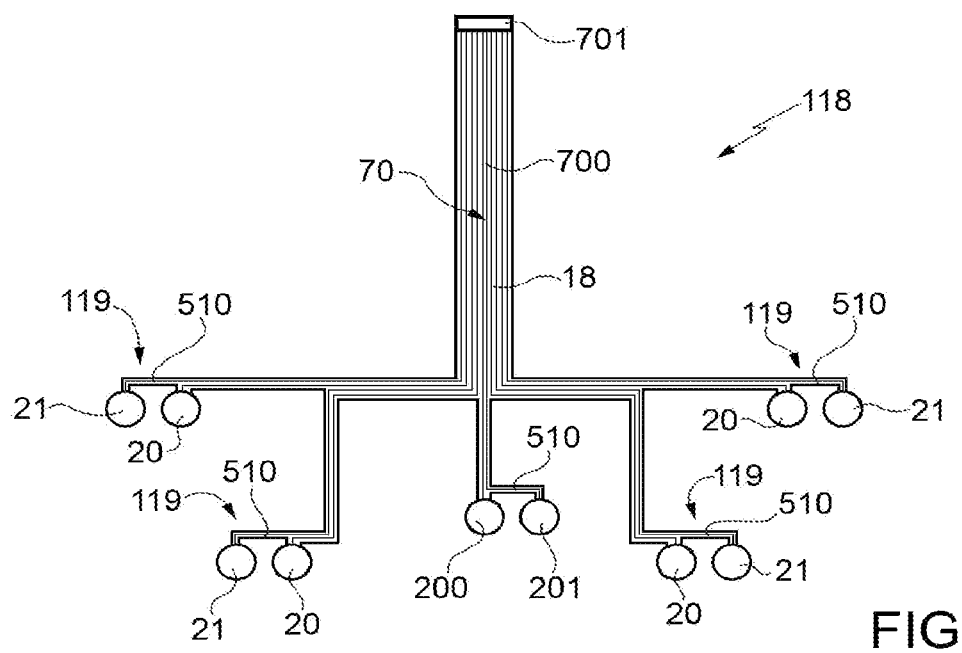
FIG. 4 schematically illustrates a plan view from above of a possible component of the brake pads of FIG. 1.
Figure 5:
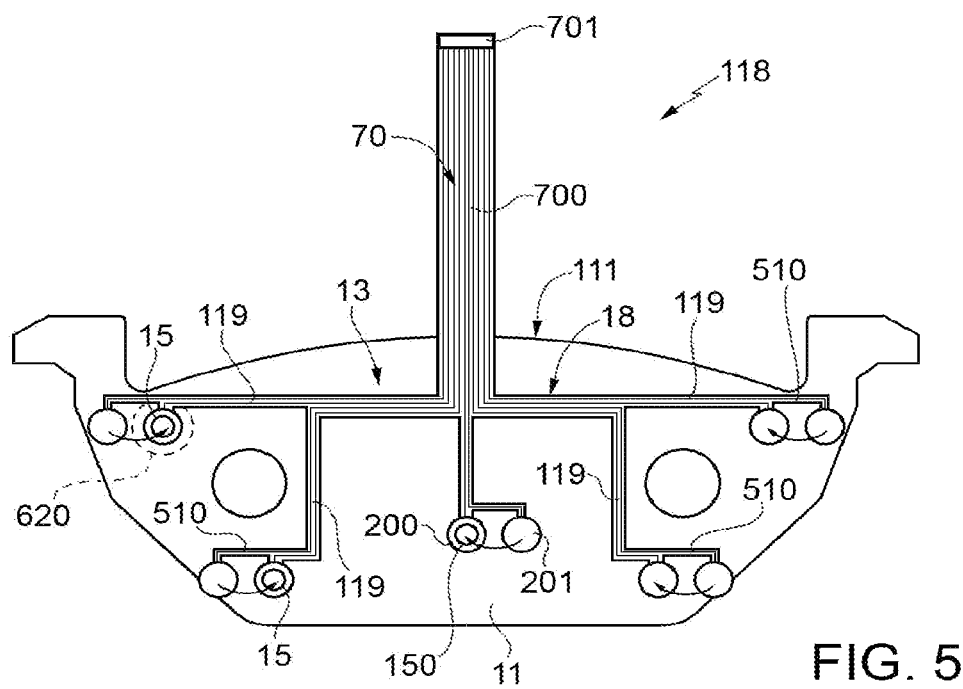
FIG. 5 schematically illustrates the application of the component of FIG. 4 to a supporting metal element of the brake pad of FIG. 1.
Figure 6:
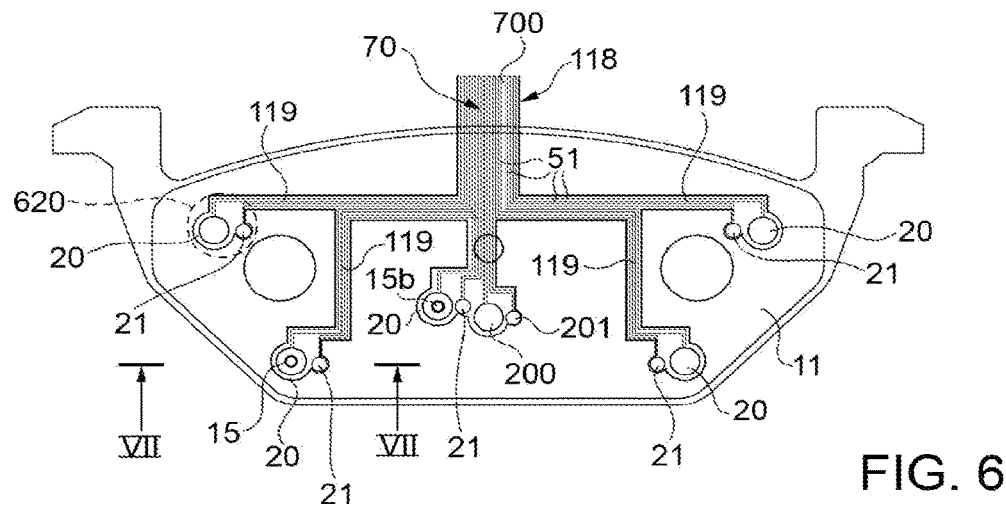
FIG. 6 illustrates the application to a supporting metal element of the brake pad of FIG. 1 of a variant of the component of FIG. 4.

According instead to the embodiments of FIGS. 4, 5 and 6 the electric circuit 18 together with the tracks 51 and the contacts 20, 21, 200, 201 are obtained by means of screen printing over a first electrically insulating polymeric layer 60 (FIG. 7), preferably made of a polyamide of the Kapton® type, and at least the tracks are covered with a second electrically insulating polymeric layer 62, preferably made of a polyamide of the Kapton® type, thus forming a self-supporting unit 70 that, because of the branchings 119, presents itself in the form of a tree, insofar as the polymeric layers 60,62 are shaped such that they follow the desired layout for the circuit 18; this self-supporting unit 70, whose contacts 20, 21, 200, 210 are uncovered and therefore exposed (FIG. 4) is then pasted directly above the surface of the metallic element 13 of the supporting metal element 11 which, also in this case, is not necessarily equipped with the recesses 31,32 (FIG. 5), insofar as the thickness of the self-supporting and electrically insulated unit 70 (measured perpendicularly to the surface 13) is in the order of magnitude of only a few tens of microns for example, 20-40 microns maximum. The unit 70 is preferably glued to the surface 13 by means of acrylic or silicone adhesives and can be preformed and coated on one of its faces which is intended in use to contact with the surface 13 which already has a patch type layer of adhesive covered with a peelable protective sheet.

Finally, the sensors 15,15b,150 are mechanically connected to a first contact 20 (200) of a first track 51 and a second contact 21 (201) of a second track 51 obtained in a position immediately adjacent and coplanar with the first contact 20/200, arranging a first face 7 of the sensor 15,150 against the first contact 20/200 and folding the second contact 21/201 (FIG. 5) book-wise on the first contact 20 and against a second face 6 of the sensor 15 (150) opposite the first, with the sensor 15 (150) arranged sandwiched between the first and the second contact 20,21 (200,201).

In order to carry out this operation, the layers 60,62 must be flexible, as must also be the tracks 51 and between each pair of adjacent contacts 20,21 (or 200,201) there must be a section 510 of track 51 that is securely flexible and of sufficient length to allow for proper folding. The contacts 20,21,200,201 are secured to the sensors 15,15b,150 by means of gluing using electrically conductive adhesives, which are for example epoxy based, or by means of soldering, for example using tin pastes, and are then electrically insulated by means of dripping upon the same and upon the contacts 20,21,200,201 of adhesive or electrically insulating sealant drops 620 (FIGS. 5 and 7).

According instead to the embodiment of FIG. 6, the self-supporting unit 70, formed as previously described, does not necessarily have to be flexible and presents the contacts 20,21 or 200,201 as terminations for each branching 119 which are arranged as coplanar and in strictly adjacent positions, essentially the electric circuit 18 does not feature the joint sections 510 of the variants in FIGS. 4 and 5. In this case, after the unit 70 has been made and after fixing it by means of gluing it onto the surface 13, the electric and mechanical connection of the sensors 15,15b, 150 is carried out by arranging a first face 7 of each sensor 15,150 against a respective first contact 20/200 and connecting the second contact 20/201 to the second face of the sensor by means of wire bonding; each sensor 15,150 together with the parts of the relative contacts 20,21,200,201 that remained uncovered and with the bridges 50 of the wire bonding is then coated with an electrically insulating layer defined by a drop 620 of electrically non conductive adhesive or sealant (see FIGS. 6 and 9).

According to the embodiments of FIG. 4,5,6 the circuit 18 of the self-supporting and electrically insulated unit 70 is terminated on the side opposite to the sensors 15,150 by a flat electric multichannel cable connection 700 defined by the extension of all of the tracks 51 and by the electrically insulating polyamide layers 60,62 between which the tracks 50 are packed, separated and spaced apart such that they are electrically insulated one from the other; the cable 700 is left overhanging from the edge 111 of the supporting metal element 11 and may be inserted at its free end into a connector 701. Preferably, the cable 700 is instead cut flush with the edge 111 and upon this edge 111 of the supporting metal element 11, which is arranged on the opposite side to the branchings 119, a shallow recess 181 is obtained within which an electric connector 180 is fitted such as the one shown in FIG. 1, which is electrically connected to the electric circuit 18 in order to capture the signals.

This last solution is the only one applicable to the embodiment of FIG. 8, where the tracks 51 silk-screened directly over the surface 13 together with the insulating layers 60,62 ending exactly at the shallow recess 181 with a series of uncovered contacts 172 (FIG. 8); subsequently, before forming the friction material block 14 and the relative layer 12, the connector 180 is fitted into the shallow recess 181 such that it couples directly to the uncovered contacts 172, that are thus electrically insulated and at the same time forming the electric connection between the electric circuit 18 and the connector 180.

Once the forming of the friction material block 14 has been completed, the sensorized brake pad 1 made according to the invention is complete and all that remains is to apply, if necessary, to at least one piezoceramic sensor 15, or to the plurality of sensors 15,15b distributed upon the surface 13, by means of the connector 180 or the connector 701 with the cable 700, a fixed potential difference adapted to re-polarize the piezoceramic material from which the sensors 15 are made. For this purpose, the connector 180/701 may have to be suitable to withstand a maximum voltage of not less than 25 kilo volts.

The connector 180/701, the body of which can be made of a polymer or ceramic material, must in all cases be impervious to liquids and powders and resistant to both high temperatures (above 200° C.) and low temperatures (for example −60° C.) which may be experienced during operation.

The invention claimed is:

1. A method for making sensorized brake elements for vehicles, the brake element having a supporting metal element and a friction material block formed on a first surface of the supporting metal element, the method comprising:
   integrating at least one piezoceramic sensor directly on the first surface of the supporting metal element, wherein the at least one piezoceramic sensor self-generates an electric signal when subjected to a mechanical stress;
   integrating an electric circuit directly on the first surface of the supporting metal element, the electric circuit configured for capturing the self-generated electric signal from the at least one piezoceramic sensor;
   wherein the at least one piezoceramic sensor and electric circuit are integrally fixed to the first surface of the supporting metal element and embedded within the friction material block; and
   providing the first surface of the supporting metal element with at least one seat for the at least one piezoceramic sensor, the at least one seat having a first recess having a depth of substantially an order of magnitude smaller than a thickness of the at least one piezoceramic sensor measured perpendicular to the first surface.

2. The method according to claim 1, in which the electric circuit is made as an electrically insulated unit having at least one branching ending with respective electric contacts, the method further comprising:
electrically and mechanically connecting the at least one piezoceramic sensor to the electric contacts arranges at an end of the at least one branching; and
configuring the branching to enable the at least one piezoceramic sensor to be positioned at a predetermined point on the first surface of the supporting metal element.

3. The method according to claim 2, further comprising:
providing the at least one seat with at least one groove-shaped second recess for housing the electric circuit and the at least one branching thereof substantially flush with the first surface.

4. The method according to claim 3, in which the first and second recesses are formed by one of a machining tool, laser or fine blanking of the supporting metal element.

5. The method according to claim 2, further comprising:
integrally fixing the at least one piezoceramic sensor to the first surface of the supporting metal element by gluing and electrically connecting the at least one piezoceramic sensor to at least one of the electric contacts by wire bonding.

6. The method according to claim 3, further comprising:
making the electric circuit from respective conductor cables electrically insulated from each other and from the supporting metal element in which the conductor cables are electrically connected with the electric contacts, and
arranging the electric contacts within respective grooves of the supporting metal element identified by the at least one second recess.

7. The method according to claim 3, further comprising:
defining the electric circuit by a plurality of electrically conductive tracks that are electrically insulated from each other and the supporting metal element, each of the conductive tracks ending towards the at least one piezoceramic sensor with at least one electric contact electrically and mechanically connected with the at least one piezoceramic sensor, at least one pair of the conductive tracks defining one said branching.

8. The method according to claim 7, wherein the electric circuit with the electrically conductive tracks, the electric contacts and respective electrically insulating layers over and below the conductive tracks are directly obtained by screen printing over the first surface of the supporting metal element, inside the at least one second recess, the method further comprising:
electrically and mechanically connecting a first contact of a first said conductive track to a first face of the at least one piezoceramic sensor, and a second contact of a second said conductive track and obtained in a position immediately adjacent to and coplanar with the first contact is connected to a second face of the at least one piezoceramic sensor, opposite the first face, by wire-bonding, or to a different portion of the first face of at least one said piezoceramic sensor having built up electrodes.

9. The method according to claim 7, in which the electric circuit with the conductive tracks, and the electric contacts are obtained by screen printing, over a first electrically insulating polymeric layer, said first polymeric layer being made of a polyimide and subsequently covering at least the conductive tracks with a second electrically insulating polymeric layer, said second polymeric layer being made of a polyimide, so as to form an electrically insulated self-supporting unit;
the self-supporting unit being subsequently glued directly over the first surface of the supporting metal element and finally the at least one piezoceramic sensor being mechanically and electrically connected with a first contact of a first said conductive track and with a second contact of a second said conductive track obtained in a position immediately adjacent to and coplanar with the first contact, arranging a first face of the at least one piezoceramic sensor against the first contact and folding the second contact onto the first contact and against a second face of the at least one sensor opposite the first face, with the at least one piezoceramic sensor being sandwiched between the first and the second contact; or connecting the second contact with the second face of the at least one piezoceramic sensor by means of wire bonding; the at least one piezoceramic sensor being finally coated with an electrically insulating layer.

10. The method according to claim 1, further comprising:
providing a shallow recess is provided on an edge of the supporting metal element arranged on the opposite side of the at least one branching of the electric circuit, and
configuring the shallow recess for the receipt of an electric connector, which is electrically connected to the electric circuit.

11. A sensorized brake element comprising:
a supporting metal element;
a damping and a thermally insulating layer arranged on a side of a first surface of the supporting metal element;
a friction material block integrally supported by the supporting metal element on the side of the first surface and above the damping and thermally insulating layer;
at least one piezoceramic sensor below the damping and electrically insulating layer and fixed directly over the first surface of the supporting metal element, the at least one piezoceramic sensor designed to self generate an electric signal when subjected to a mechanical stress;
an electric circuit configured to capture the electric signal, wherein the electric circuit is made as an electrically insulated unit having at least one branching ending with respective electric contacts to which the at least one piezoceramic sensor is mechanically and electrically connected, and wherein the least one piezoceramic sensor is embedded in the friction material block with the interposition of the damping and thermally insulating layer; and
at least one seat provided on the first surface of the supporting metal element for the at least one piezoceramic sensor, the at least one seat having a first recess having a depth of substantially an order of magnitude smaller than a thickness of the at least one piezoceramic sensor measured perpendicular to the first surface.

12. The sensorized brake element according to claim 11, in which the electric circuit and the at least one piezoceramic sensor are mechanically and integrally fixed to the first surface and the at least one branching is configured so as to position the at least one piezoceramic sensor at a predetermined point of the first surface.

13. The sensorized brake element according to claim 11, in which the at least one seat further includes at least one groove-shaped second recess for housing the electric circuit and the at least one branching substantially flush with the first surface.

14. The sensorized brake element according to claim 11, in which the at least one piezoceramic sensor comprises a plurality of piezoceramic sensors that are arranged on the first surface of the supporting metal element in a predetermined pattern.

15. The sensorized brake element according to claim 14, further comprising:
a temperature sensor integrally arranged on the first surface of the supporting metal element, the plurality of piezoceramic sensors and the temperature sensor each being electrically and mechanically connected with the electric circuit, which is configured to capture an electric signal emitted by each of the piezoceramic and temperature sensors.

16. The sensorized brake element according to claim 15, in which the electric circuit terminates in an electric connector on an opposite side of the electric circuit with respect to the plurality of piezoceramic sensors and the temperature sensor, the electric connector being integrated with an edge of the supporting metal element and housed within a shallow recess formed on the edge.

17. The sensorized brake element according to claim 13, in which the electric circuit is made from respective conductor cables electrically insulated from each other and from the supporting metal element in which the conductor cables are electrically connected with the electric contacts, the electric contacts being arranged within respective grooves of the supporting metal element identified by the at least one second recess.

18. The sensorized brake element according to claim 11, in which the electric circuit is defined by a plurality of electrically conductive tracks that are electrically insulated from each other and with respect to the supporting metal element, each of the conductive tracks ending towards the at least one piezoceramic sensor with at least one electric contact electrically and mechanically connected with the at least one piezoceramic sensor, and in which at least one pair of the conductive tracks defines one said branching.

19. The sensorized brake element according to claim 18, in which the electric circuit with the conductive tracks, and the electric contacts are obtained by screen printing, over a first electrically insulating polymeric layer, said first polymeric layer being made of a polyimide and subsequently covering at least the conductive tracks with a second electrically insulating polymeric layer, said second polymeric layer being made of a polyimide, so as to form the electrically insulated self-supporting unit.

* * * * *